May 15, 1951 — H. TROEGER — 2,553,220
QUICK DETACHABLE MEANS
Filed May 25, 1948 — 2 Sheets-Sheet 1
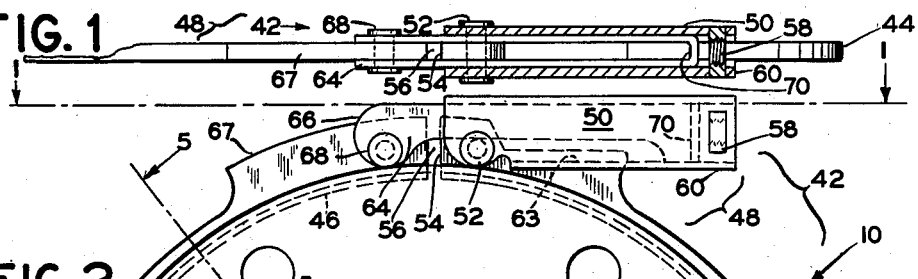
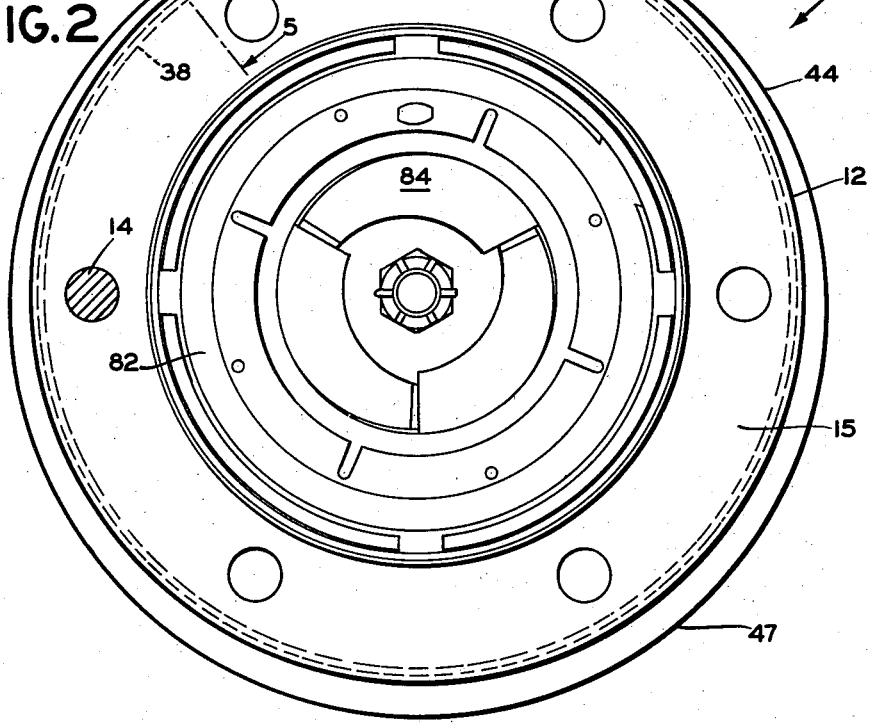
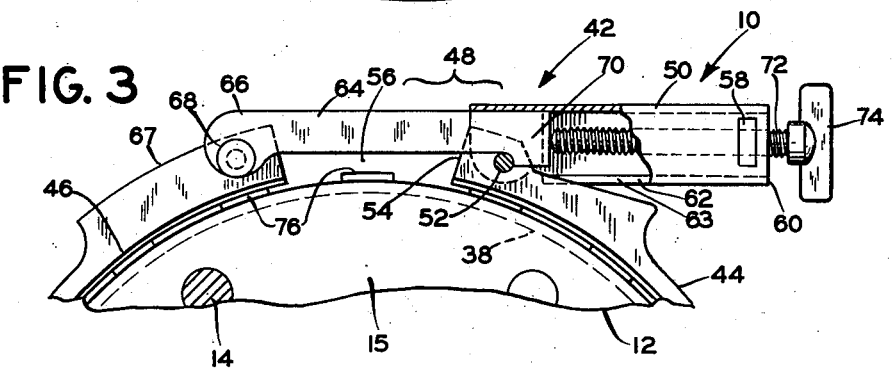
INVENTOR.
HENRY TROEGER
BY Frederic H. Miller
-ATTORNEY- May 15, 1951 H. TROEGER 2,553,220
QUICK DETACHABLE MEANS
Filed May 25, 1948 2 Sheets-Sheet 2
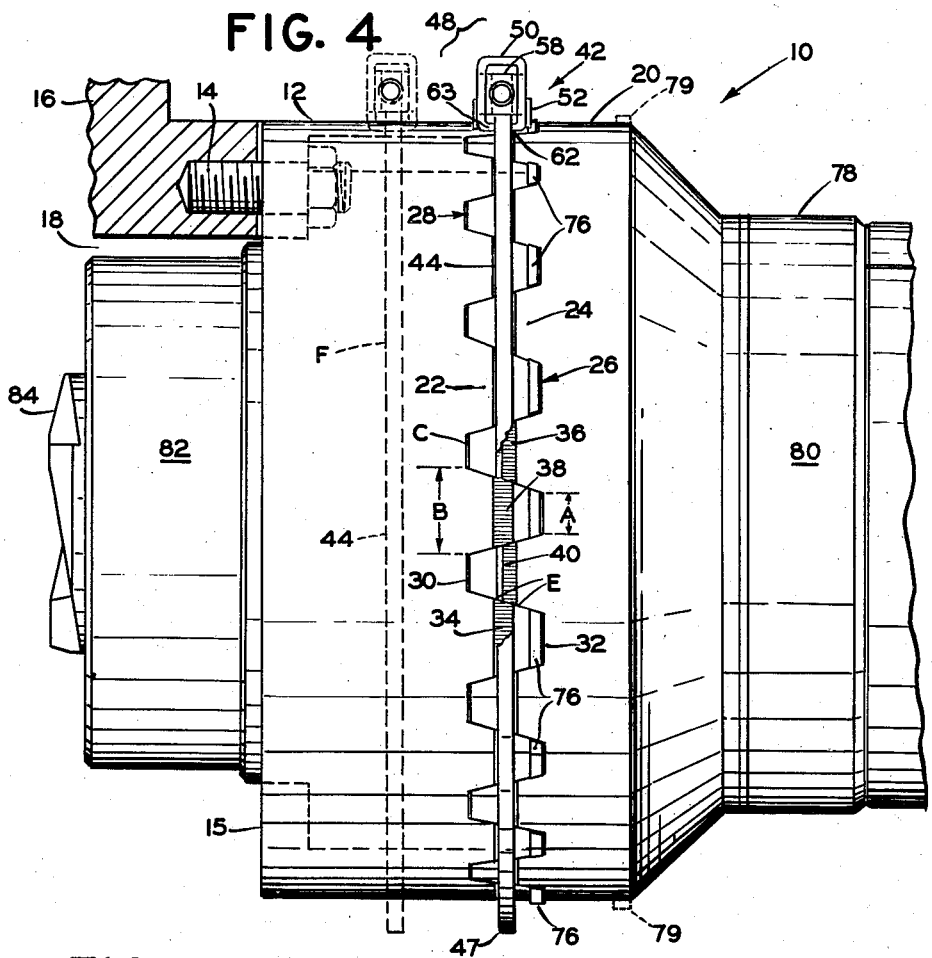
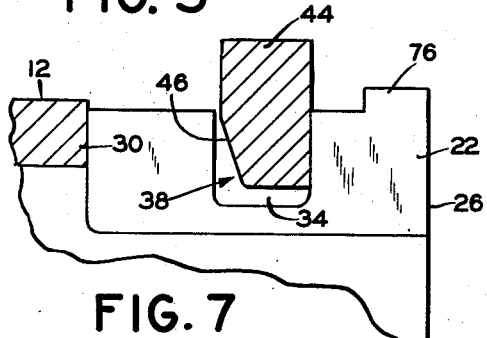
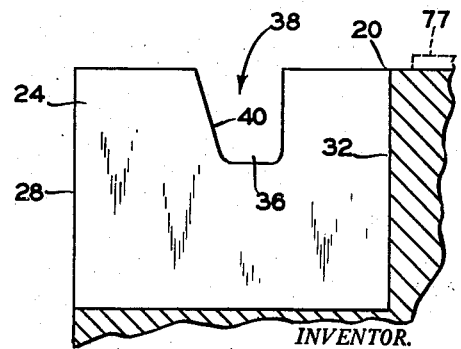
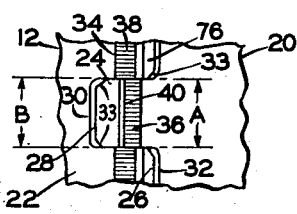
INVENTOR.
HENRY TROEGER
BY
Frederic H. Miller
-ATTORNEY- Patented May 15, 1951

2,553,220

UNITED STATES PATENT OFFICE 2,553,220

QUICK DETACHABLE MEANS

Henry Troeger, Ramsey, N. J., assignor to Bendix Aviation Corporation, Teterboro, N. J., a corporation of Delaware Application May 25, 1948, Serial No. 29,182

6 Claims. (Cl. 248—2)

This invention relates to quick detachable means, such as mountings for accessories, and particularly to such means for mounting aircraft engine accessories.

In aircraft practice, it is desirable that certain accessories be individually rapidly replaceable, and not so attached that, upon failure of one accessory, the craft may be incapacitated for an undue length of time.

An aircraft engine may have several accessories or parts detachable therefrom, such as the engine cylinders, an engine starter, a generator, a fuel pump, a vacuum pump, a carburetor, and a governor and sometimes power take-off means, cabin superchargers and other means toward, and for which, much thought and effort have heretofore been directed with a view to providing quick detachable mounting means.

By reason of the high frequency vibrations of the engine, temperature changes, lack of space, costs, impracticability of employing certain amounts and arrangements of heavy material, and other factors, the provision of an effective rapid detachable accessory mount, which is suitable in all applications and does not fail in one respect or another, has presented difficult problems, which others have tried unsuccessfully to solve. An outstanding failure of all such prior devices is the inability of the parts to remain tight under engine vibration for any appreciable length of operation.

Among the objects of the present invention are to overcome all of the disadvantages of prior devices of the above-indicated character, and to do so by novel effective manner and means.

Another object is to provide a quick detachable connector or accessory mount which, instead of having mounting members which work loose under continued vibration, has members which tend to tighten, and to remain at an effective degree of tightness, during the entire period of installation, such that service tightening is never necessary.

Another object is to provide cylindric mounting members in a connector as aforesaid, which members have adjacent-end teeth adapted for axial meshing, and which teeth operate as means for piloting the members together.

Another object is to provide such teeth in wedge form such that, in operative relation, the outer teeth ends are in position short of engagement with the tooth-space bottoms, and the toothed members are more firmly related to each other.

Another object is to provide apparatus in which engine and accessory members include teeth having lateral recesses or channels the major section areas of which are adapted for substantial register with each other to form a groove for a resilient split ring or a ring having like characteristics, but which are slightly offset longitudinally and otherwise formed for effecting the above-mentioned tightening under vibration.

Another object is to provide detachable means of the above-indicated character which is simple and durable in construction, economical to manufacture and effective in its operation.

The above and other objects and features of the invention will appear more fully hereinafter from a consideration of the following description taken in connection with the accompanying drawings wherein embodiments of the invention are illustrated by way of example.

In the drawing:

Figure 1 is a view taken substantially along the line 1—1 of Figure 2;

Figure 2 is an elevation, viewed from the inner or engine end, of an accessory in the form of an engine starter, and showing the invention in one form; a locking ring of the structure being illustrated in operative position holding the accessory to the engine and being partly broken away at about the center of the figure;

Figure 3 is a fragmentary view of the upper portion of Figure 2 showing the ring expanded and moved to the left of its position of Figure 2 to an inactive broken-line position F of Figure 2 on a toothed adapter member of the invention associated with the engine when the accessory is detached;

Figure 4 is a side elevation of the device as shown in Figure 2, viewed from the right, with associated engine parts, not shown in Figure 2, shown in section, the toothed adapter or engine member being shown at the left for the reception of a toothed accessory member at the right;

Figure 5 is an enlarged fragmentary detail section of the adapter taken substantially along the line 5—5 of Figure 2;

Figure 6 is a view similar to Figure 5 of the accessory member; and

Figure 7 is a fragmentary detail, similar to a portion of Figure 4, showing a modified form of teeth, as viewed in Figure 4, the locking ring being omitted.

Referring principally to Figures 2 and 4, a quick detachable engine accessory mount 10, comprises a base or open-bottom cylindric adapter or cup-member 12 for attachment, as by studs 14, with its bottom wall 15 next to an engine case 16 around an opening 18 thereof, and a cylindric or annular accessory portion or member 20. The engine adapter and accessory members 12 and 20, include axial wedge-like elements or teeth 22 and 24 around the axes of the members, respectively, adapted, by reason of the shorter peripheral extent A of the outer teeth ends relative to the peripheral extent B of the outer ends of the spaces between the teeth, for ready axial side-by-side wedge meshing to positions C, Figure 4, with the outer ends 26 and 28 of the teeth 22 and 24 short of engagement with the tooth space bottoms 30 and 32, respectively.

The ratio of A to B may, of course, be varied, including the variation in which the teeth sides are parallel to the axes of the members 12 and 20, as shown in Figure 7, in which chamfers 33 assist in the meshing of the teeth.

The teeth 22 and 24 have lateral recesses or channels 34 and 36, respectively, for substantial register in the position C, Figure 4, to form an annular groove 38, but in slightly axially offset relation to each other, as indicated at points E, the accessory teeth recesses 36 having sloping lateral sides 40 next to the engine.

Means 42, for locking the members 12 and 20 together, in the lengthwise direction of the elements or teeth 22 and 24, comprises a resilient ring-like element or split ring 44 for position in the groove 38, and for resilient action, in this case radially inwardly, tending to move the ring 44, or relatively movable body sections thereof, into the groove 38, adapted to be held laterally of the recesses 34 and 36 therein under the vibration of the engine, and including a side surface 46 sloping in relation to the sloping sides 40, in the accessory channels 36, tending to move the accessory member 20 toward the engine. The ring 44, in this instance, has inner and outer edges eccentric to each other rendering the ring body radially wider at a lower portion 47, as shown.

Means 48, acting in this instance as means for spreading the ring 44, comprises a hollow arm 50 pivoted, as by a pivot pin 52 in the form of a rivet, to a radially widened end 54 of the ring, at one side of the split 56, the right as shown in Figure 2, about an axis parallel to the ring axis, and extending laterally of its axis away from the split at the side at which it is pivoted. A nut 58 is fixed in the arm 50 adjacent to the outer arm end 60. The arm 50 has an inner side, or bottom lengthwise, slot 62 formed by turned-in edges 63, as better shown in Figures 3 and 4, adapting the arm to embrace the ring 44. A lever 64, pivoted at one end 66, as by a pivot pin or rivet 68, to a radially widened end 67 of the ring 44 at the other side of the split 56, as by a pivot pin or rivet 68, crosses the split to lie within the hollow arm 50, in the operative condition of the ring, with an end 70 opposite the nut 58. The latter is adapted to receive a screw 72, Figure 3 for action against the lever end 70 to distort the ring 44, in this case enlarging the ring, to a diameter freeing it from the groove 38 with the lever end 70 against the pivot pin 52 of the arm 50. The screw 72 may be a standard screw of comparatively ready availability, if lost, which may be operated as with a screw driver or coin, or provided with a permanent thumb piece 74, or be a standard thumb screw or other device. The lever 64 is, in this example, constructed of a strip of sheet metal return bent upon itself to form the end 70 and to straddle the ring 44 at the lever end 66. The ring 44, instead of being the contracting type as shown, may, in certain applications of this invention, obviously be of the expanding type for movement into an internal groove of the teeth, in which case, the means 48 would become ring contracting instead of expanding means as shown.

The adapter 12, in this case, provides for supporting the ring 44 axially inwardly, or to the left of the groove 38, in the inactive condition of the ring, when the accessory member 20 is detached, by having the outer diameter of the adapter, to the left of the groove, slightly less than the expanded inner diameter of the ring, means, in the form of radially outer shoulders 76 on the teeth 22 of the adapter 12 of collectively greater diameter than the expanded inner diameter of the ring, prevent withdrawal of the ring 44 from the adapter outwardly, or to the right, of the recesses 34. Obviously, the shoulders 76, instead of being on the adapter, could be on the accessory 20, as indicated by broken lines 77, Figure 6, for resting the means 42 in inactive position, on the accessory between the shoulders and an annular shoulder 79 indicated in broken lines in Figure 4.

The accessory member 20, in this example, is part of a casing 78 of an engine starter 80 extending as a cantilever from the base member 12, and which comprises a baffle 82, in the opening 18, from which baffle protrudes a starter jaw 84 for axial movement to engage an engine jaw, and rotative movement to start the engine.

In operation, with the parts in the positions shown in Figures 2 and 4, when it is desired to remove the starter 80, the screw 72 of Figure 3 is inserted in the nut 58 of Figures 1 and 2 and turned against the lever end 70 until the latter engages the rivet 52, Figure 3, in which position the ring is expanded to its maximum allowable diameter permitting it to be removed from the groove 38 and slid to the left on the adapter 12, to some such position as indicated by broken lines F but preventing it from being removed to the right by the shoulders 76. The starter is separately supported during the manipulation of the ring 44, as aforesaid, and removed to the right as soon as the ring is removed from the groove or moved to the left as stated. There is thus, no loose part to be lost or considered, separate and apart from the engine and the accessory, except possibly the screw 72, which may be constituted either as a permanent or a separable part of the structure.

When mounting the accessory 20 on the adapter 12, the teeth 24 and 22 are placed together as indicated in Figure 4. The ring 44 is moved from the position F to its full-line position of Figure 4, and the screw 72 turned until it disengages, and is spaced some distance away from, the end 70.

Under the latter condition, the ring 44 contracts into the groove 38 against the sloping surfaces 40 and, under the contracting force of its own resiliency, moves, or tends to move the accessory 20 closer to the adapter 12 and the engine. Seating of the ring during assembly may be manually assisted by jiggling the accessory, so that the ring may further contract against the surface 40. However, if a final position of the parts has not thus been attained, the tendency to reach such position will be exercised upon the first operative vibration from the engine in service. Under vibration, since the ring 44 is constantly under the bias of its own resiliency, the ring constantly tends to move further radially into the groove, and in no case, tends to loosen or require manual tightening in service at any time.

Since the ring 44 operates under shear, which is widely distributed because of the number of teeth 22 and 24, it may consist of considerably less stock and have other advantages over a ring of channel section having flanges of the base and the accessory in the channel tending to separate the channel sides.

The means 48, which in this instance operates as a ring spreader, but which, in the case where the ring expands to operative position, may be ring contracting means for detaching the accessory, may also, in certain applications, as where the spring is light be omitted as part of the assembly.

Although several embodiments of the invention have been set forth, various changes in the form, texture and relative arrangements of the parts may be made to suit requirements.

What is claimed is:

1. In a quick-detachable accessory mount, cylindric base and accessory members having adjacent-end wedge-like teeth for ready axial wedge meshing with each other to position with the outer teeth ends short of engagement with the tooth space bottoms and having lateral channels to form an annular groove adapted to receive a ring-like element spring biased into the groove for locking the members axially together, the accessory teeth channels having sloping lateral sides next to the engine member for cooperation with the ring to tend to move the accessory toward the engine.

2. A device for quickly attaching and detaching an engine accessory member to an engine, comprising a sleeve member adapted to be attached to the engine, said accessory member and said sleeve member being slotted at their adjacent ends to provide circumferentially-spaced, axially-projecting, wedge-like teeth for axial meshing with each other, said teeth having transverse channels which form an annular groove when said teeth are in mesh with each other, the channel on one of said members having a sloping wall adjacent the other of said members, a resilient clamping ring adapted to be inserted in said groove and to coact with said sloping wall to hold said teeth in mesh and to lock said members axially together.

3. A device for quickly attaching and detaching an engine accessory member to an engine, comprising a sleeve member adapted to be attached to the engine, said accessory member and said sleeve member being slotted at their adjacent ends to provide circumferentially-spaced, axially-projecting, wedge-like teeth for axial meshing with each other, said teeth having transverse channels the major section areas of which are adapted for substantial register when said teeth are in mesh to form an annular groove but which have a relatively slight longitudinal offset, and a fastening ring adapted to be inserted in said annular groove to hold said teeth in mesh for locking said members axially together.

4. A device for quickly attaching and detaching an engine accessory member to an engine, comprising a sleeve member adapted to be attached to the engine, said accessory member and said sleeve member being slotted at their adjacent ends to provide circumferentially-spaced, axially-projecting, wedge-like teeth for axial meshing with each other, said teeth having transverse channels the major section areas of which are adapted to form an annular groove when said teeth are in mesh but which have a relatively small offset, a compression ring adapted to be inserted in said groove, said ring cooperating with said offset to bias said teeth in mesh for locking said members axially together, and means for locking said ring in said annular groove.

5. A device for quickly attaching and detaching an engine accessory member to an engine, comprising a sleeve member adapted to be attached to the engine, said accessory member and said sleeve member being slotted at their adjacent ends to provide circumferentially-spaced, axially-projecting, wedge-like teeth for axial meshing with each other, said teeth having transverse channels which form an annular groove when said teeth are in mesh with each other, a resilient fastening ring adapted to be inserted in said annular groove to hold said teeth in mesh for locking said members axially together, and means for locking said ring in said annular groove, the teeth on one of said members having radially outwardly extending projections to prevent said ring from slipping off said member when removed from said annular groove.

6. A device for quickly attaching and detaching an engine accessory member to an engine, comprising a sleeve member adapted to be attached to the engine, said accessory member and said sleeve member being slotted at their adjacent ends to provide circumferentially-spaced, axially-projecting, wedge-like teeth for axial meshing with each other, said teeth having transverse channels which form an annular groove when said teeth are in mesh with each other, a compression ring adapted to be inserted in said annular groove to hold said teeth in mesh for locking said members axially together, and means for locking said ring in said annular groove, the teeth of said sleeve member having radially outwardly extending projections to prevent said ring from slipping off said sleeve member when removed from said annular groove.

HENRY TROEGER.

REFERENCES CITED

The following references are of record in the file of this patent:

UNITED STATES PATENTS

| Number | Name | Date |
|---|---|---|
| 386,882 | Hecox | July 31, 1888 |
| 1,435,028 | Stewart | Nov. 7, 1922 |
| 1,882,616 | Hutchinson | Oct. 11, 1932 |
| 2,439,161 | Du Bois | Apr. 6, 1948 |